M. J. Martin,
Stump Elevator.
Nº 36,227.  Patented Aug. 19, 1862.
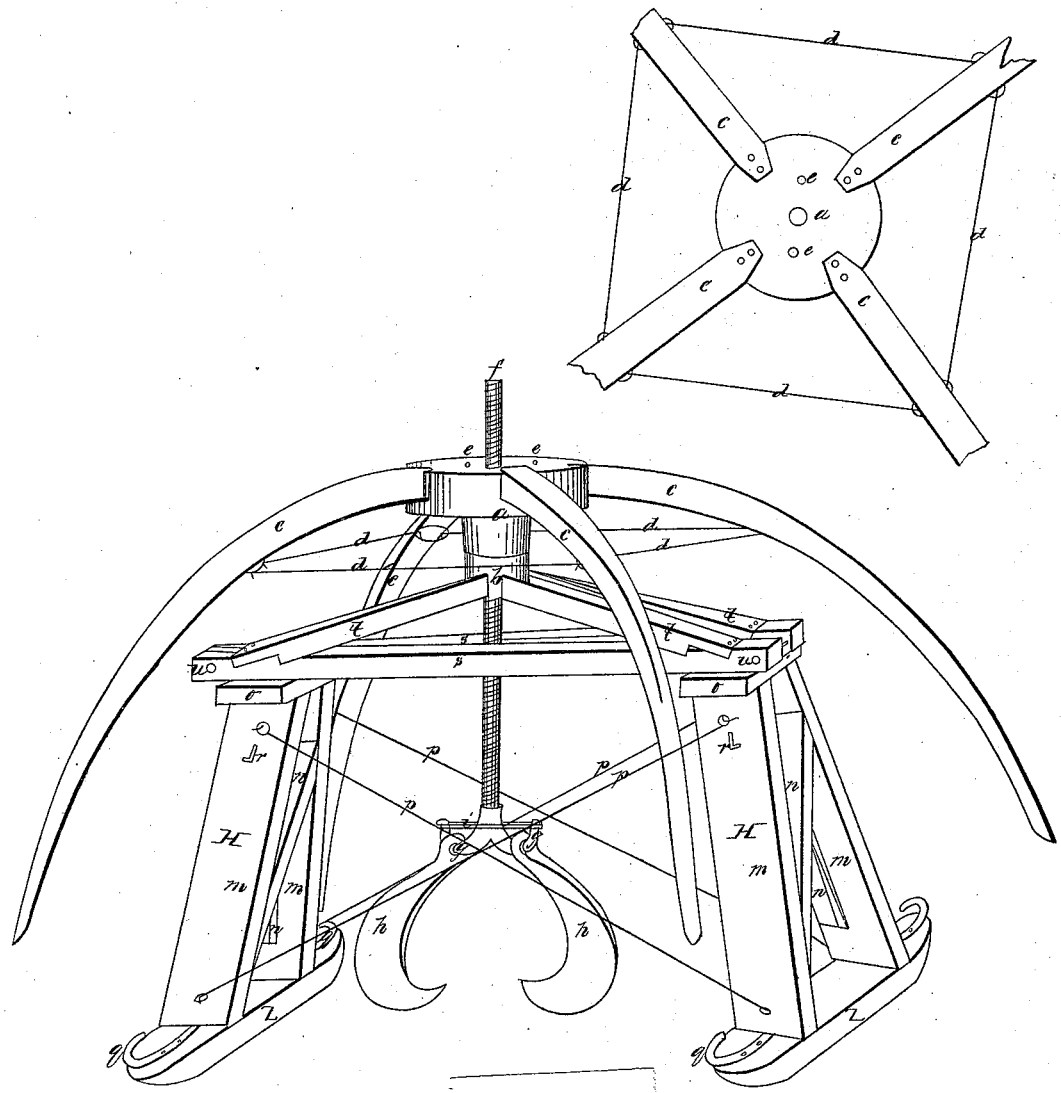
Witnesses:
E. A. Steele
R. S. Saywards
Inventor:
Michael J. Martin

UNITED STATES PATENT OFFICE.

MICHAEL J. MARTIN, OF BELLEVILLE, ILLINOIS.

IMPROVEMENT IN STUMP-EXTRACTORS.

Specification forming part of Letters Patent No. 36,227, dated August 19, 1862.

*To all whom it may concern:*

Be it known that I, MICHAEL J. MARTIN, of Belleville, in the county of St. Clair and State of Illinois, have invented a new and useful Improvement in Machinery for Extracting Stumps and Lifting Heavy Weights, which I call a "Stump-Puller;" and I do hereby declare that the following is a full, clear, and exact description of the same, reference being had to the annexed drawings, making a part of this specification, and to the letters of reference marked thereon.

The invention relates to that class of machines that are generally called "stump-extractors;" and it has for its principal objects the employment of the power of teams and an arrangement of frame that will not interfere with a proper and easy adjustment of the fastenings.

It consists of a frame with shifting diagonal braces that may be readily placed aside to enable the operator to work around the stump or weight to be lifted, and of a screw with grappling-hooks that are attached to the stump, and with a nut supported by a washer on the frame and operated by power-levers that are bent over the frame and down toward the ground.

To enable others skilled in the arts appertaining to my invention to make and use the same, I will proceed to describe its construction and operation, with reference to the drawings.

Figure 1 is a perspective view of my said improved machine; and Fig. 2 is a plan of a part of the same, in which the levers are shown attached to the screw-nut and braced together with iron rods.

The frame is composed of two end trestles, H H, made with a sill, $l$, two posts, $m\ m$, and two diagonal braces, $n\ n$, and a cap, $o$, upon which rest the tie beams or cords $s\ s$, which carry the four braces $t$, that are footed into the ends of the tie-beams and are converged together at the center to carry the washer $b$. The bolts $u\ u$ connect the tie-beams at their ends. The sills $l$ are furnished with hooks $q$, to facilitate the shifting of the machine. The end trestles are braced by the diagonal tie-rods $p$, that may be hooked up on the hooks $r$ out of the way of the operator when the power is not being applied to the machine.

The working parts of the machine are composed of the screw $f$, carrying the grappling-hooks $h\ h$ at the lower end and the nut $a$ on the upper end, that rests upon the washer $b$ and is furnished with a mortised flange for the reception of the power-levers $c$. The hooks $g$, that carry the grappling-hooks $h$, are strengthened and sustained by the loop $i$. The screw-nut $a$ has holes $e$, by which oil may be carried to the bearing-surface of the washer. The power-levers $c$ are bent over the frame, so that teams may be conveniently attached, and they are braced by the tie-rods $d$. As these levers are carried around the circle, the screw is run up and the stump or weight is lifted.

I claim as my invention and desire to secure by Letters Patent—

The combination of the frame with shifting braces $r$, the screw with grappling-hooks $h$, and the nut with bent power-levers $c$, arranged in the manner described, and for the purpose specified.

M. J. MARTIN.

Witnesses:
G. W. CARTER,
OSCAR F. GRIFFEN.